United States Patent
Bezzi (10) Patent No.: US 8,990,252 B2
(45) Date of Patent: *Mar. 24, 2015

(54) ANONYMITY MEASURING DEVICE

(71) Applicant: Accenture Global Services Limited, Dublin (IE)

(72) Inventor: Michele Bezzi, Antibes (FR)

(73) Assignee: Accenture Global Services Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/735,727

(22) Filed: Jan. 7, 2013

(65) Prior Publication Data

US 2013/0138676 A1 May 30, 2013

Related U.S. Application Data (63) Continuation of application No. 12/524,912, filed as application No. PCT/EP2008/050908 on Jan. 25, 2008, now Pat. No. 8,407,246.

(51) Int. Cl.
*G06F 17/30* (2006.01)
*G06F 21/62* (2013.01)

(52) U.S. Cl.
CPC ...... *G06F 17/30386* (2013.01); *G06F 21/6245* (2013.01)
USPC ...................................................... 707/782

(58) Field of Classification Search
None
See application file for complete search history.

(56) References Cited

U.S. PATENT DOCUMENTS

| | | | |
|---|---|---|---|
| 6,037,987 A | 3/2000 | Sethuraman | |
| 6,253,203 B1 | 6/2001 | O'Flaherty et al. | |
| 6,504,935 B1 | 1/2003 | Jackson | |
| 6,618,721 B1 | 9/2003 | Lee | |
| 6,807,569 B1 * | 10/2004 | Bhimani et al. | 709/217 |
| 7,058,638 B2 | 6/2006 | Singh | |
| 7,363,299 B2 | 4/2008 | Dalvi et al. | |
| 7,606,788 B2 | 10/2009 | Samar | |
| 7,620,940 B2 | 11/2009 | Goldsmith et al. | |
| 7,630,986 B1 | 12/2009 | Herz et al. | |
| 7,698,250 B2 | 4/2010 | Dwork | |
| 7,716,592 B2 | 5/2010 | Tien et al. | |
| 7,769,707 B2 | 8/2010 | Dwork et al. | |
| 7,818,335 B2 | 10/2010 | Dwork et al. | |
| 7,925,617 B2 | 4/2011 | Mishra | |
| 7,934,190 B1 | 4/2011 | Allen et al. | |
| 7,971,131 B1 | 6/2011 | Ordentilch et al. | |
| 8,005,821 B2 | 8/2011 | Dwork et al. | |

(Continued)

OTHER PUBLICATIONS

International Search Report for priority PCT/EP2008/050908 issued Apr. 7, 2008, 3 pages.

(Continued)

*Primary Examiner* — Hung Q Pham
(74) *Attorney, Agent, or Firm* — Harrity & Harrity, LLP (57) ABSTRACT

The invention concerns a data anonymity measuring device for selectively transmitting an anonymized database to a third party comprising: calculation means (402) coupled to at least one memory, the memory storing an original database (204) and said anonymized database (206), said calculation means arranged to calculate the conditional entropy for each entry in said anonymized database based on entries in said original database; comparing means (406) arranged to compare at least one of said conditional entropies with a threshold value; and output means (410) arranged to transmit said anonymized database based on the result of said comparison.

20 Claims, 4 Drawing Sheets

(56) References Cited

U.S. PATENT DOCUMENTS

| | | | |
|---|---|---|---|
| 8,051,033 | B2 | 11/2011 | Kenedy et al. |
| 8,407,246 | B2 | 3/2013 | Bezzi |
| 2002/0169793 | A1 | 11/2002 | Sweeney |
| 2002/0176494 | A1 | 11/2002 | Zhao et al. |
| 2003/0124999 | A1 | 7/2003 | Parssinen et al. |
| 2003/0161550 | A1 | 8/2003 | Cheng et al. |
| 2003/0215092 | A1 | 11/2003 | Dick |
| 2004/0049517 | A1* | 3/2004 | Singh .......................... 707/102 |
| 2006/0059189 | A1 | 3/2006 | Dunki et al. |
| 2006/0123462 | A1 | 6/2006 | Lunt et al. |
| 2007/0083493 | A1 | 4/2007 | Dwork et al. |
| 2007/0130147 | A1 | 6/2007 | Dwork et al. |
| 2007/0136027 | A1 | 6/2007 | Dwork et al. |
| 2007/0143289 | A1 | 6/2007 | Dwork et al. |
| 2007/0146631 | A1 | 6/2007 | Sinclair et al. |
| 2007/0147606 | A1 | 6/2007 | Dwork |
| 2007/0256061 | A1 | 11/2007 | Victorov |
| 2008/0209568 | A1 | 8/2008 | Chang et al. |
| 2008/0275900 | A1 | 11/2008 | Zurek |
| 2009/0254971 | A1 | 10/2009 | Herz et al. |
| 2010/0162402 | A1 | 6/2010 | Rachlin et al. |
| 2010/0329490 | A1 | 12/2010 | Van Schijndel et al. |
| 2011/0041184 | A1 | 2/2011 | Cormode et al. |
| 2011/0052087 | A1 | 3/2011 | Mukherjee |
| 2011/0119661 | A1 | 5/2011 | Agrawal et al. |
| 2011/0231661 | A1 | 9/2011 | Ramakrishnan et al. |

OTHER PUBLICATIONS

Skiner et al., "Estimating the re-identification risk per record in microdata", Journal of Official Statistics, vol. 14, No. 4, pp. 361-372 (1998).
Ohno-Machado et a., "Protecting patient privacy by quantifiable control of disclosures in disseminated databases", International Journal of Medical Informatics, vol. 73, Nos. 7-8, Aug. 2004, pp. 599-606, XP004521015.
Atzori et al., "Anonymity preserving pattern discovery", 23 pages (2008).
Arikan et al., "Guessing Subject to Distortion", IEEE May 1998, 30 pages.
Liu et al., "Wavelet-Based Data Distortion of Simultaneous Privacy-Preserving and Statistics-Preserving", May 25, 2008, 19 pages.
Aspray et al., "Globalization and Offshoring of Software", ACM, 8 pages (2006).
Bruneton et al., "ASM: a code manipulation tool to implement adaptable systems", Nov. 2002, 12 pages.
Cadar et al., "KLEE: Unassisted and automatic generation of high-coverage tests for complex systems programs", Dec. 2008, pp. 209-224.
Castro et al., "Better bug reporting with better privacy", Mar. 2008, pp. 319-328.
Clause et al., "Dytan: a generic dynamic taint analysis framework", ACM, pp. 196-206 (2007).
Cohen et al., "Automatic program transformation with Joie", proceedings of the USENIX Annual Technical Symposium, Jun. 1998, pp. 167-178.
Cormode et al., "Anonymized data: generation, models, usage", Proceedings of the 35$^{th}$ ACM ISGMOD, pp. 1016-1018 (2009).
Csallner et al., "DySy: Dynamic symbolic execution for invariant inference", Proceedings of the 30$^{th}$ ACM/IEEE ICSE, May 2008, pp. 281-290.
Dillon et al., "Oracles for checking temporal properties of concurrent systems", appears in ACM SIGSOFT '94, Dec. 1994, pp. 140-153.
Emmi et al., "Dynamic test input generation for database applications", ISSTA, pp. 151-162 (2007).
Godefroid et al., "Dart: Directed automated random testing", Proceedings of the ACM SIGPLAN PLDI, 11 pages, Jun. 2005.
Harrold et al., "A Methodology for Controlling the size of a test suite", ACM Transactions on Software Engineering and Methodology, vol. 2, No. 3, Jul. 1993, pp. 270-285.
"IBM: Optim Integrated Data Management", http://www-01.ibm.com/software/data/data-management/optim-solutions, Aug. 12, 2010 (print date).
Kapfhanuner et al., "A family of test adequacy criteria for database-driven applications", Proceedings of the 11th ACM SIGSOFT FSE, pp. 98-107 (2003).
Kim et al., "A history-based test prioritization technique for regression testing in resource constrained environments", appears in ICSE, pp. 119-129 (2002).
Landi, "Undecidability of static analysis", ACM Letters on Programming Languages and Systems, vol. 1, No. 4, Dec. 1992, pp. 323-337.
LeFebre et al., "Mondrian multidimensional k-anonymity", Proceedings of the 22nd ICDE, p. 25 (2006).
Nin et al., "Attribute selection in multivariate microaggregation", Proceedings of the PAIS, ACM, pp. 51-60 (2008).
Peters et al., "Generating a test oracle from program documentation: work in progress" appears in ISSTA '94, pp. 58-65 (1994).
Ren et al., "Chianti: a tool for change impact analysis of java programs", appears in OOPSLA, pp. 432-448 (2004).
Richardson, "Taos: Testing with Analysis and Oracle Support", appears in ISSTA '94: Proceedings of the '94 ACM SIGSOFT ISSTA, pp. 138-153 (1994).
Richardson, "Specification-based Test Oracles for Reactive Systems", appears in Proceedings of the 14th ICSE, pp. 105-118, May 1992.
Bayardo, "Data Privacy Through Optimal K-Anonymization", pp. 217-228 (2005).
Dalenius, "Finding a Needle in a Haystack-or Identifying Anonymous Census Record", Journal of Official Statistics, vol. 2, No. 3, pp. 329-336 (1986).
Kargupta, "On the Privacy Preserving Properties of Random Data Perturbation Techniques", appears in ICDM, 8 pages (2003).
LeFebre et al., "Incognito: Efficient Full-Domain K-Anonymity", SIGMOD, pp. 49-60 (2005).
Massey, "Guessing and Entropy", appears in IEEE Symposium on Information Theory, 1 page, 1994.
Muralidhar, "Security of Random Data Perturbation Methods", ACM Trans Database System, vol. 24, No. 4, pp. 487-493 (1999).
Renyi, "On Measures of Entropy and Information", appears in 4th Berkeley Symposium on Mathematical Statistics and Probability, 15 pages (1961).
Sarnarati, "Protecting Privacy when Disclosing Information: K-Anonymity and its Enforcement Through Generalization and Suppression", Proceedings of the IEEE Symposium on Research in Security and Privacy, 19 pages (1998).
Sweeney, "Achieving K-Anonymity Privacy Protection Using Generalization and Suppression", International Journal on Uncertainty, Fuzziness and Knowledge-based Systems, vol. 10, No. 5, pp. 571-588 (2002).
Arikan, "An Inequality on Guessing and its Application to Sequential Decoding", IEEE Transactions on Information Theory, vol. 42, No. 1, 7 pages, Jan. 1996.
Domingo-Ferrer, "A Quantitative Comparison of Disclosure Control Methods for Microdata", Confidentiality, Disclosure, and Data Access: Theory and Practical Applications for Statistical Agencies, pp. 111-133 (2001).

* cited by examiner

Table 1

| Id (r) | Zip code | Age | Start date | Quantity |
|---|---|---|---|---|
| 1 | 76013 | 32 | 1988 | 500 |
| 2 | 75001 | 38 | 1999 | 250 |
| 3 | 76011 | 56 | 2001 | 500 |
| 4 | 78123 | 12 | 1999 | 250 |
| 5 | 75011 | 34 | 1999 | 250 |
| 6 | 75001 | 26 | 1991 | 250 |
| 7 | 76014 | 52 | 2001 | 500 |

Original Database $P(r=1|s=3)=0.2$
$P(r=3|s=3)=0.4$
$P(r=7|s=3)=0.4$

Table 2

| Id (s) | Zip code | Age | Start date | Quantity |
|---|---|---|---|---|
| 1 | 76* | 42 | 19* | >300 |
| 2 | 750* | 41 | 19* | <300 |
| 3 | 76* | 55 | 200* | >300 |
| 4 | 78* | 15 | 200* | <300 |
| 5 | 750* | 33 | 200* | <300 |
| 6 | 750* | 58 | 200* | <300 |
| 7 | 76* | 55 | 200* | >300 |

Anonymized Database

ANONYMITY MEASURING DEVICE

CROSS-REFERENCE TO RELATED APPLICATION

The instant application is a continuation of co-pending U.S. patent application Ser. No. 12/524,912 entitled "Anonymity Measuring Device" and filed Jan. 5, 2010, the teachings of which are incorporated herein by this reference.

FIELD OF THE INVENTION

The present invention relates to the field of measuring the anonymity of data, and in particular to determining the anonymity of data in a database when compared to an original database.

BACKGROUND OF THE INVENTION

Databases often comprise sensitive data. For example, databases containing records of clients at a hospital may include references to the names of clients, their particular medical histories, and other details such as the age, height, weight, etc. Another example of a database containing sensitive data would be a database at a bank including customers' names, account numbers, and transaction histories.

In order to perform market research, for example for determining improvements that can be made to services, or to monitor trends, it is generally necessary to use genuine data. However, when the genuine data is sensitive data, for example including client records, confidentiality of the client must be maintained, and therefore the database is preferably anonymized prior to providing this data to third parties.

Techniques are known for anonymizing data, however a difficulty in prior art systems is that there is currently no effective method of knowing when data has been sufficiently anonymized so that it can be provided to third parties without the risk of jeopardizing confidentiality. There is thus a technical problem in providing a system that is able to determine when data may be transmitted to third parties, in other words when the data has been sufficiently anonymized.

SUMMARY OF THE INVENTION

Embodiments of the present invention aim to provide a data anonymity measuring device or method of measuring data anonymity.

According to one aspect of the invention, there is provided a data anonymity measuring device for selectively transmitting an anonymized database to a third party comprising: a calculation unit coupled to at least one memory, the memory storing an original database and said anonymized database, said calculation unit arranged to calculate the conditional entropy for each entry in said anonymized database based on entries in said original database; a comparator arranged to compare at least one of said conditional entropies with a threshold value; and an output unit arranged to transmit said anonymized database based on the result of said comparison.

According to one embodiment of the present invention, the conditional entropy is calculated based on the probability of each entry in the original database given an entry in the anonymized database.

According to one embodiment of the present invention, the conditional entropy (h(s)) is determined according to the following formula:

$$h(s) = -\sum_{r \in R} P(r \mid s) \log_2 P(r \mid s)$$

wherein r is an entry in the original database, R represents all of the entries in the original database, s is an entry in the anonymized database, and P(r|s) is the probability of r given s.

According to one embodiment of the present invention, the device comprises a minimum entropy determination unit for determining a minimum entropy of said conditional entropies, and wherein said comparator is arranged to compare said minimum conditional entropy with said threshold value.

According to a further aspect of the present invention, there is provided a selective transmission device for selectively transmitting an anonymized database to a third party comprising the anonymity measuring device described above.

According to one embodiment of the present invention, the device comprises circuitry for erasing said anonymized database from said memory under the control of said anonymity measuring device if one or more of said conditional entropies is lower than said threshold value.

According to a further aspect of the present invention, there is provided a method for selectively transmitting an anonymized database to a third party, the method comprising: for each entry in said anonymized database, determining the conditional entropy based on entries in an original database; comparing at least one of said conditional entropies with a threshold entropy value; and selectively transmitting said database to said third party based on the result of said comparison.

According to one embodiment of the present invention, the step of determining said conditional entropy for each entry in said anonymized database comprises the step of, for each entry in said original database, calculating the cumulative entropy (h) using the following formula:

$$h = h - P(r_a \mid S_b) \log_2 P(r_a \mid S_b)$$

wherein $r_a$ is a currently processed entry in the original database, $s_b$ is the currently processed entry in the anonymized database.

According to one embodiment of the present invention, if said minimum entropy is less than said threshold value, further anonymizing said anonymized database.

According to a further aspect of the present invention, there is provided a computer program comprising preprogrammed instructions for causing a processor to execute the above method.

According to a further aspect of the invention, there is provided a data anonymity measuring device comprising: one or more inputs coupled to one or more memories in which an original database and an anonymized database are stored, each database comprising a plurality of entries; a conditional entropy calculation unit having access to said original database and said anonymized database via said inputs and arranged to calculating the conditional entropy of each entry in said anonymized database based on the entries in said original database; a comparator arranged to compare at least one of said conditional entropies with a threshold value; and an output unit arranged to provide an output based on said comparison.

According to one embodiment, the output means is one of a display arranged to indicate to a user whether or not said anonymized database has been sufficiently anonymized, based on the result of said comparison performed by said comparator; and a communications interface arranged to transmit said anonymized database to a third party based on the result of said comparison performed by said comparator.

According to yet a further aspect of the present invention, there is provided a method for determining whether an anonymized database may be transmitted to a third party, the method comprising, for each entry in said anonymized database, determining the conditional entropy based on the probability that each entry in an original database is the source of the anonymized entry; comparing at least one of said conditional entropies with a threshold entropy value; and providing an output based on said comparison.

According to one embodiment, the method further comprises indicating on a user display whether or not said database may be transmitted to a third party based on the result of said comparison.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which.

DETAILED DESCRIPTION OF EMBODIMENTS OF THE PRESENT INVENTION

Figure 1:
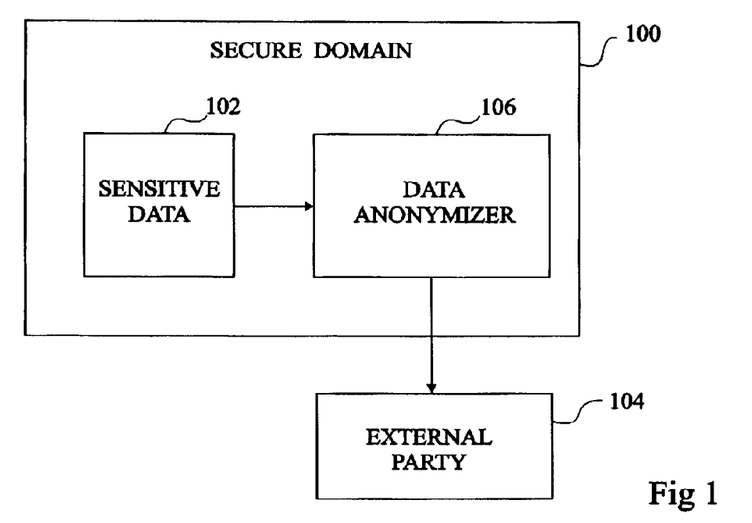
FIG. 1 illustrates sensitive data in a secure domain.

FIG. 1 illustrates a secure domain 100 which is for example a hospital, a bank, dentist surgery, etc. The secure domain 100 includes a memory 102 storing sensitive data in a database. This sensitive data 102 is confidential, and while it may be accessed within the secure domain, for example by authorized personnel in a bank, or doctors at hospital, to maintain confidentiality it should not leave the secure domain in its current form.

An external party 104 wishes to perform analysis on the sensitive data, and therefore requests access to the data. The external party may for example be a research lab, school or university, or other third party such as a company interested in developing new applications for use in the secure domain. The third party may be willing to pay for access to the data. In order to allow the sensitive data to be provided to the external party 104, the sensitive data from the database must first be anonymized by a data anonymizer 106, which takes each entry from the database, and adjusts each field of each entry in such a way that sensitive information in the database is protected. For example, this includes preventing any recognizable link between entries in the database and individuals associated with the data entries. It may include removing the name field of each entry from the database entirely, generalizing other parameters, and adding random noise to other parameters.

Even once anonymization has been performed by the data anonymizer 106, the personnel of the secure domain 100 are generally very hesitant in providing the data to third parties, as it is difficult to be certain that the data has been sufficiently anonymized so that it maintains complete or acceptable confidentiality of the individuals associated with the data.

Some systems have been proposed that determine, in a general fashion, the level of anonymity of a database. One system has been proposed that is based on K-anonymity, however this system is generally limited to a subset of the types of possible anonymization transformations (i.e. deterministic transformations) that can be performed, and is therefore not general enough for many anonymized databases. Another system has been proposed that is based on mutual information, however such a system is generally inadequate as it does not guarantee the anonymity of every entry in the database.

Figure 2:
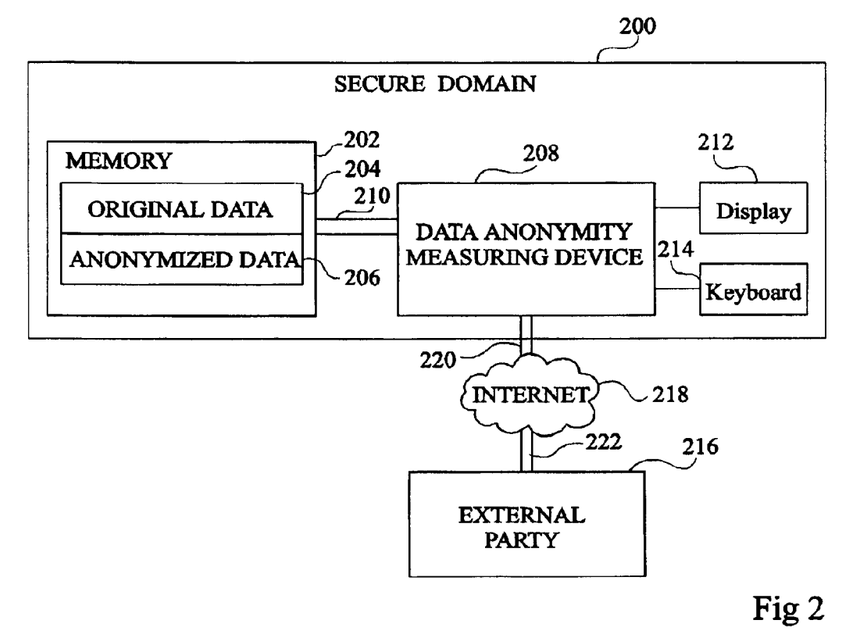
FIG. 2 illustrates a secure domain comprising a data anonymity measuring device according to an embodiment of the present invention.

FIG. 2 illustrates a secure domain 200, which is similar to secure domain 100 described above, and is for example a hospital, a bank, dentist surgery or similar. Secure domain 200 however includes a data anonymity measuring device, which in this example provides the technical function of allowing transmission of the sensitive data to third parties only when it has been sufficiently anonymized.

Within secure domain 200 a database is stored that contains data entries comprising sensitive data. According to the present invention, the secure domain 200 includes a memory 202, such as a computer hard disk or digital cassette, on which a database of original sensitive data 204 is stored. Within the same memory 202, or in a separate memory, a second version of the database is stored, which is an anonymized database, containing an anonymized version of some or all of the entries of the sensitive database.

The anonymized database is labeled 206 in FIG. 2. The data has for example been anonymized by a data anonymizer (not shown in FIG. 2) such as the data anonymizer 106 of FIG. 1, which may comprise a suitable computer program for processing the data entries. For example, data anonymization is performed automatically using techniques such as generalization, suppression and randomization in order to anonymized the data.

Generalization means that specific information is put into a more general form. For example, an address which includes a house number, street name, town, county and country, could be generalized to just giving the county and the country. Thus, whereas the specific entry could be linked directly to one particular household, the generalized entry can only be linked to a certain county, which is for example the same county as many other entries in the database. Furthermore, data can be generalized by putting the data into more general categories. For example, rather than providing an age field providing an age in years and months, ages could be generalized into age brackets of ten years, for example between 0 and 10 years, 10 and 20 years, 20 and 30 years, etc.

Suppression means that data is removed from the database. For example, names of individuals in the database can generally be suppressed entirely, as this data is often not of interest to third parties. Thus the name field of each entry is for example deleted. Another example would be to entirely delete telephone numbers or banking account numbers, or to remove certain digits of these numbers.

Randomization implies adding random noise to the data, such that the original data cannot be determined easily. This can be performed for example without losing key characteristics of the data, such as its standard deviation, or mean value. For example, height and weight fields could be randomized by adding noise determined by a normal distribution. In this case, the mean height and weight of all the height and weight values in the database may be kept substantially the same.

Figure 3:
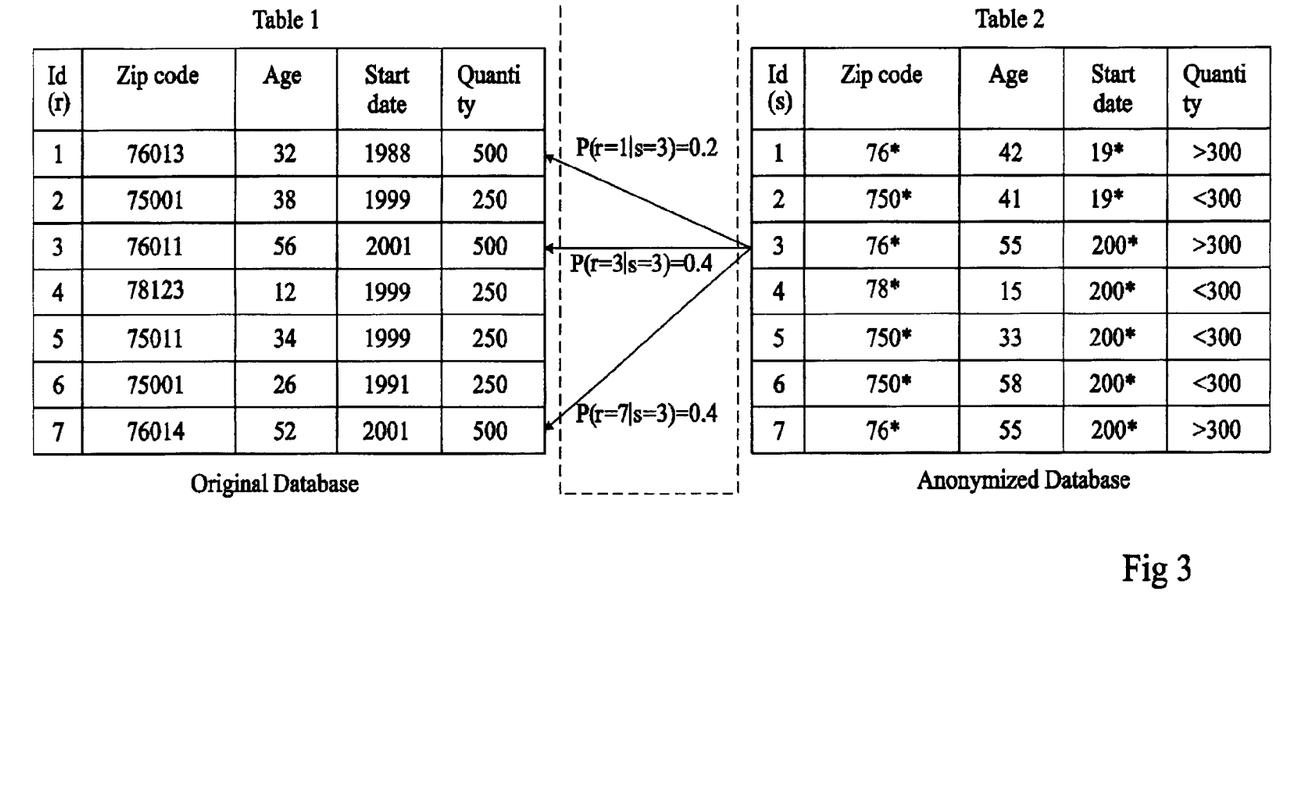
FIG. 3 illustrates two tables 1 and 2 which provide an example of an original database and an anonymized database respectively.

FIG. 3 shows two tables, tables 1 and 2, which provide examples of an original database and an anonymized database respectively. For example, the original database of table 1 is stored in the original data part 204 of the memory 202, while the anonymized database of table 2 is stored in the anonymized data section 206 of the memory 202.

Each entry in each database has a first field with an identification number, indicating its position in the database. The other fields in the database have been anonymized. Each entry includes a "Zip code" field, an "Age" field, a "start date" field, and a "Quantity" field. As illustrated, in the anonymized database of table 2, Zip codes have been generalized by removing the last three digits of codes starting with "76" and "78", and removing the last two digits of codes starting with "75". The ages in each entry have been anonymized by adding random noise. The start date has been generalized by removing the indication to the year, but keeping the indication of the century or decade. The quantities have been generalized by grouping the data into one of two ranges, either smaller than or greater than 300.

With reference again to FIG. 2, a data anonymity measuring device 208 is provided for determining whether or not the anonymized data is sufficiently anonymized to be provided to an external party. In particular, device 208 measures the anonymity based on a comparison between the original database and the anonymized database. This involves determining the information lost regarding the identity of a single entry in the original database when that entry is transferred to the anonymized database, when all of the entries in the anonymized database are known.

The data anonymity measuring device 208 has access to the memory 202 via a communication interface 210, which is for example a serial bus, parallel bus, or the like. The data anonymity measuring device 208 for example comprises a PC (personal computer) having a central processing unit, RAM, power supply unit, etc., which are not shown in FIG. 2. A user display 212 and a user keyboard 214 are provided allowing a user some control over the device.

The data anonymity measuring device 208 may communicate data to an external party 216 outside the secure domain 200, via for example the Internet. Thus, the data anonymity measuring device 208 has access to the Internet 218 as shown in FIG. 2 by a connection 220, which is for example a broadband connection, and the external party 216 also has access to the Internet via a similar connection 222. The data may be provided to the external party from the data anonymity measuring device 208 in the form of an Email, direct transfer, or similar means.

Figure 4:
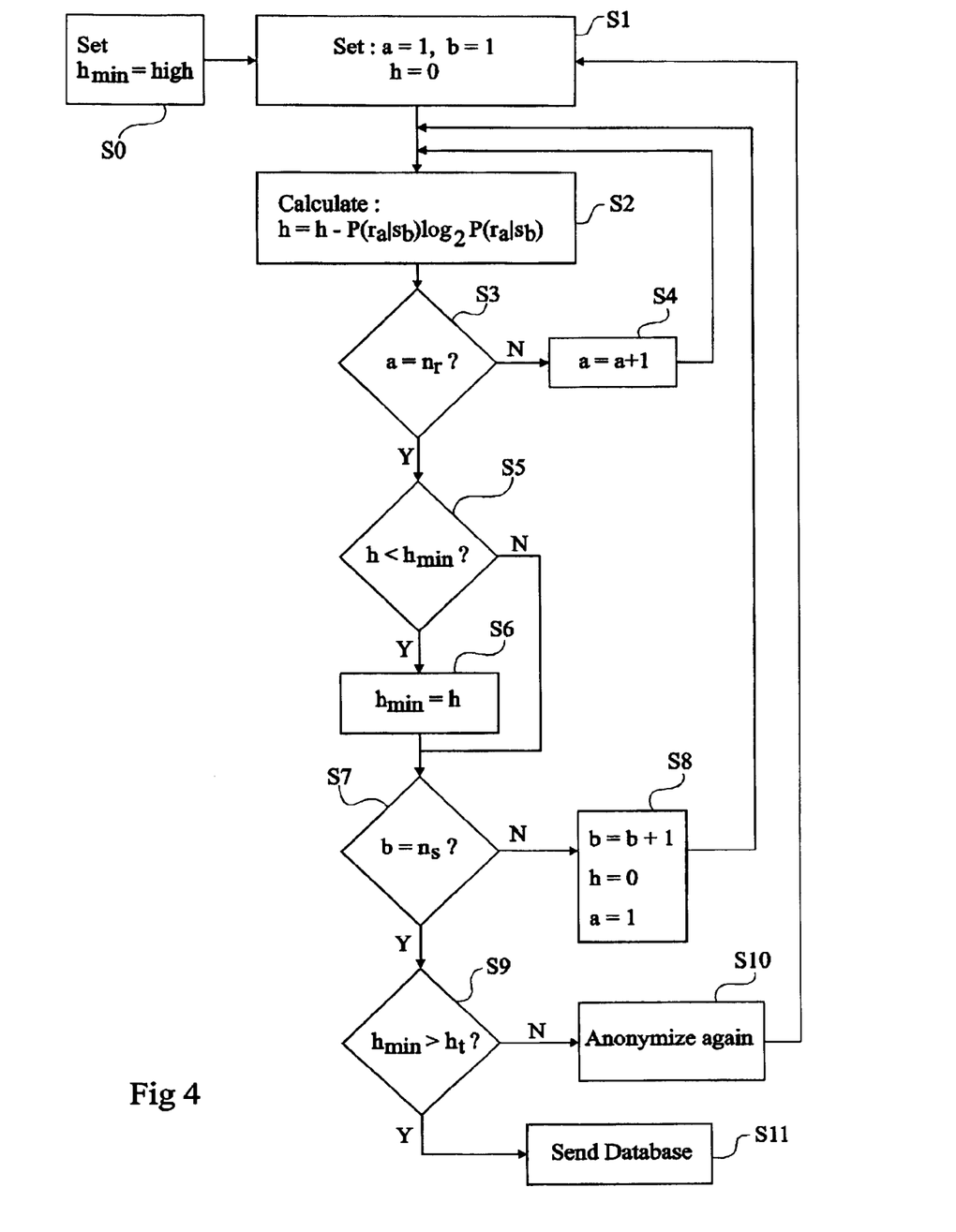
FIG. 4 is a flowchart showing steps in a method of measuring data anonymity according to embodiments of the present invention.

FIG. 4 is a flow diagram illustrating steps that may be performed by the data anonymity measuring device 208 in order to determine whether or not data should be provided to the external party 216. A technical result, in other words the transmission or non-transmission of the database, may therefore be determined and performed by the data anonymity measuring device 208.

The steps of FIG. 4 will now be described using the example of the sensitive database and anonymized database of the tables 1 and 2 respectively of FIG. 3.

In an initial step S0, a parameter $h_{min}$ is defined, and set high. Preferably it is set to the highest possible numerical value for this parameter, or at a value higher than any likely entropy value. The reason for this will become apparent herein below.

Next, in a first step S1, parameters a, b and h are defined, and set to 1, 1 and 0 respectively. These values are for example stored in registers, and can be updated during execution of the method.

After step S1, step S2 is performed, in which a weighted term is determined, this value contributing to a sum of values that determines the conditional entropy h(S) associated with an entry s in the anonymized database. This weighted term, which is not an entropy value, but which contributes to the conditional entropy, will be referred to herein as a partial entropy term. The conditional entropy is calculated as the sum of the partial entropy terms, which are calculated based on the probabilities of each entry r in the original database given a particular entry s in the anonymized database. The formula for the conditional entropy is as follows:

$$h(s) \equiv H(R \mid s) = -\sum_{r \in R} P(r \mid s) \log_2 P(r \mid s) \quad (1)$$

where R represents all of the entries in the original database, r is an entry in the original database, s is an entry in the anonymized database, and P(r|s) is the probability of r given s. In this example, a large value of the conditional entropy h(s) indicates a high anonymity of that entry, and a low risk of disclosing sensitive information, while a low value of h(s) indicates a low anonymity, and a high risk of disclosing sensitive data.

The formula in step S2 of FIG. 4 calculates partial entropy term, based on the entry $r_a$ in the original database and the entry $s_b$ in the anonymized database, where $r_a$ and $s_b$ are the $a^{th}$ and $b^{th}$ entries in the original database and anonymized databases respectively, a and b being determined by the stored values of a and b at the time step S2 is performed. This partial entropy term is then added to the previously computed sums, and stored as the parameter h. The formula performed in step S2 is thus:

$$h = h - P(r_a \mid s_b) \log_2 P(r_a \mid s_b) \quad (2)$$

In the example that the original database is table 1, and the anonymized database table 2, the first time step S2 is performed, a=1 and b=1, and therefore the term $P(r_a \mid s_b)$ in formula (2) is the probability of the first entry in table 1 given the first entry in table 2, in other words the probability that the first entry in table 2 is generated by the first entry in table 1.

The probabilities P(r|s) can be calculated using various techniques, and applying known algorithms, based on similarity measures, for example including Euclidean or Mahalanobis distance or generalization steps. As an example, the probability $P(r_1 \mid s_1)$ that the first data entry in table 1 is the source of the first data entry in the anonymized database can be calculated as follows.

Firstly, regarding the zip code, this code has been generalized as 76* in the anonymized database, whereas the original entry in the original database was 76013. It follows that 76* is a generalization of 76013. Therefore, to determine the probability that 76* is the entry 76013, all of the entries falling within this category, in other words entries 1, 3 and 7 are added to give a total of 3 entries (all generated by the same number of generalization steps, i.e. removing the last four digits from the original zip code), and the probability is thus ⅓ that 76* refers to entry 1, if we consider just this field.

Next, age 42 is compared to age 32 in the original database. For this determination, it is necessary to make an assumption of the particular type of randomization used to alter the age (e.g. Gaussian noise). Assuming a normal distribution of the added random noise, the further the anonymized age 42 is from the original age 32, the lower the probability that such an entry originated from entry 1 of the database.

The probability that 19* originated from 1988 is determined in a similar fashion to the determination of the zip code probability, based in the total number of entries in the original database having a start date in the 1900's. Likewise the determination that the quantity greater than 300 originates from the original entry 500 of entry 1 in the original database is determined based on the total number of entries in the original database having a quantity greater than 300.

It should be noted that, as a general rule, the sum of the probabilities P(r|s) over the original database entries for a particular entry s should add to 1. The probability $P(r_1|s_1)$ is for example determined as being equal to 0.3, and applying this to the formula (2), this gives a first partial entropy term contributing to the entropy, h, of 0.521.

In a next step S3 it is determined whether a is now equal to $n_r$, where $n_r$ is the total number of entries in the original database. In the present example, at this stage a is equal to 1 and $n_r$ equal to 7, and therefore a is not equal to $n_r$. If the response is negative, the next step is S4, whereas if the response is positive (a=$n_r$) we move to step S5.

In step S4, a is incremented by 1, in other words, a=a+1. Step S2 is then repeated. This time, in step S2, a new value of h is calculated as the previous value of h added to a new partial entropy term. As a is now equal to 2, the new partial entropy term is based on the probability of the second entry $r_2$ in the original database given the first entry $s_1$ in the anonymized database. It should be noted that given that in the second entry of the original database the zip code equals 75001, there is no chance that a generalization of this entry resulted in the first entry of the anonymized database, and therefore the probability for this entry is zero.

Step S3 is then repeated, and in the present example a is now equal to 2 and not 7, and therefore we move to S4 again. The loop comprising blocks S2, S3 and S4 is repeated until a is equal to $n_r$, and the partial entropy terms for all of the entries in the original database have been calculated. In the present example, step S2 will be performed a total of seven times. The value of h then equals the conditional entropy h(s) for an entry $s_b$ in the anonymized database, as determined by formula (1) above.

In step S5, it is determined whether h is less than parameter $h_{min}$. $h_{min}$ was set in step S1 to 100, which in this example is a value much higher than any likely conditional entropy, and therefore a first iteration h will be less than $h_{min}$. $h_{min}$ is preferably chosen initially to be larger than any likely value of conditional entropy, such that during the first iteration $h_{min}$ is set to h. If the answer is "Yes", h is less than $h_{min}$, then the next step is step S6.

In S6, $h_{min}$ is set to the value of h. The next step after S6 is S7. If in step S5 h is not less than $h_{min}$, then we go directly to step S7.

In step S7, it is determined whether b is equal to $n_s$, where $n_s$ is the total number of entries in the anonymized database. If b is not equal to $n_s$ we go to S8. If b is equal to $n_s$ we go to S9.

In the present example, $n_s$ is equal to 7. The number of entries in the anonymized database will usually equal the number of entries in the original database, however in some embodiments a smaller set of data may be provided in the anonymized database, if certain entries in the original database are removed entirely. In the present example, b is equal to 1 and not 7, so we move to step S8.

In step S8, b is set to b+1, h is reset to 0, and a is reset to 1. After step S8, we return to step S2. The loop comprising steps S2, S3 and S4 is then repeated until a is equal to the total number of entries in the original database, which in this example is equal to 7. Thus a new value of h is calculated giving a new conditional entropy value based on the second entry $s_2$ in the anonymized database. Once a=7, the next step is step S5, in which it is again determined whether h is less than $h_{min}$. In the second iteration, $h_{min}$ has been set to the first value of h determined in the previous iteration, while h is the new value of the conditional entropy that has just been calculated. Again, if $h_{min}$ is greater than h, then $h_{min}$ is replaced by the new value of h, whereas if not, we move directly to step S7.

The second iterative loop, comprising S7, S8 and the first iterative loop is repeated until a conditional entropy value h has been calculated for all of the entries s in the anonymized database, and $h_{min}$ has been set to the lowest entropy value calculated. In this example, seven conditional entropy values are calculated, one for each entry in the anonymized database, and once b is equal to 7, we move to step S9.

In step S9, it is determined whether $h_{min}$ is greater than a certain threshold. $h_{min}$ provides an indication of the anonymity of the data in the anonymized database, and in particular, $h_{min}$ provides an indication of the worst case anonymity of all of the entries in the anonymized database. Thus, if one entry in the anonymized database is not sufficiently anonymized with respect to an entry in the original database, the entropy will be smallest for this value, and this value of entropy will be stored as $h_{min}$.

The threshold value $h_t$ is a threshold entropy level that can be set by the user as a minimum entropy for any one particular anonymized data entry. This value also allows an estimation to be made of the minimum quantity of information lost ΔI in the anonymization procedure, defined as:

$$\Delta I \geq N \times h_{min}$$

where N is the number of entries anonymized.

In step S9, if $h_{min}$ is smaller than the threshold, it is determined that anonymization of the data has not been performed sufficiently, and we move to step S10. If $h_{min}$ is larger than the threshold, it is determined that the data has been sufficiently anonymized, and the next step is S11.

In this example step S10 comprises anonymizing the data again, using a different anonymization algorithm to provide increased anonymization of the data entries. For example, more random noise could be added to certain values in the database, values could be generalized more broadly, and/or certain fields or parts of fields could be deleted. As an alternative, the data entry causing the particularly low entropy could be removed from the anonymized database. The process of determining the anonymity of the data in the anonymized database is then repeated after S10 by returning to step S1.

In alternative embodiments, if it is determined that the data is not sufficiently anonymized, it could be decided that further anonymization would render the data useless to third parties, and therefore the system will not allow the anonymized data to be sent. According to some embodiments, in this case the system is arranged to erase the anonymized database from memory to ensure that it cannot be transmitted.

However, if it is determined that $h_{min}$ is greater than the threshold $h_t$, we move to step S11. In step S11, the database is sent to third parties, outside of the secure domain. Alternatively, a message is provided on the user display 212 indicating that clearance is provided for the anonymized database to be sent. The database could then be printed, and provided in paper form by the user to an external party, or the user could send the database by using the keyboard 214 to command the system to send the database, for example via email.

Figure 5:
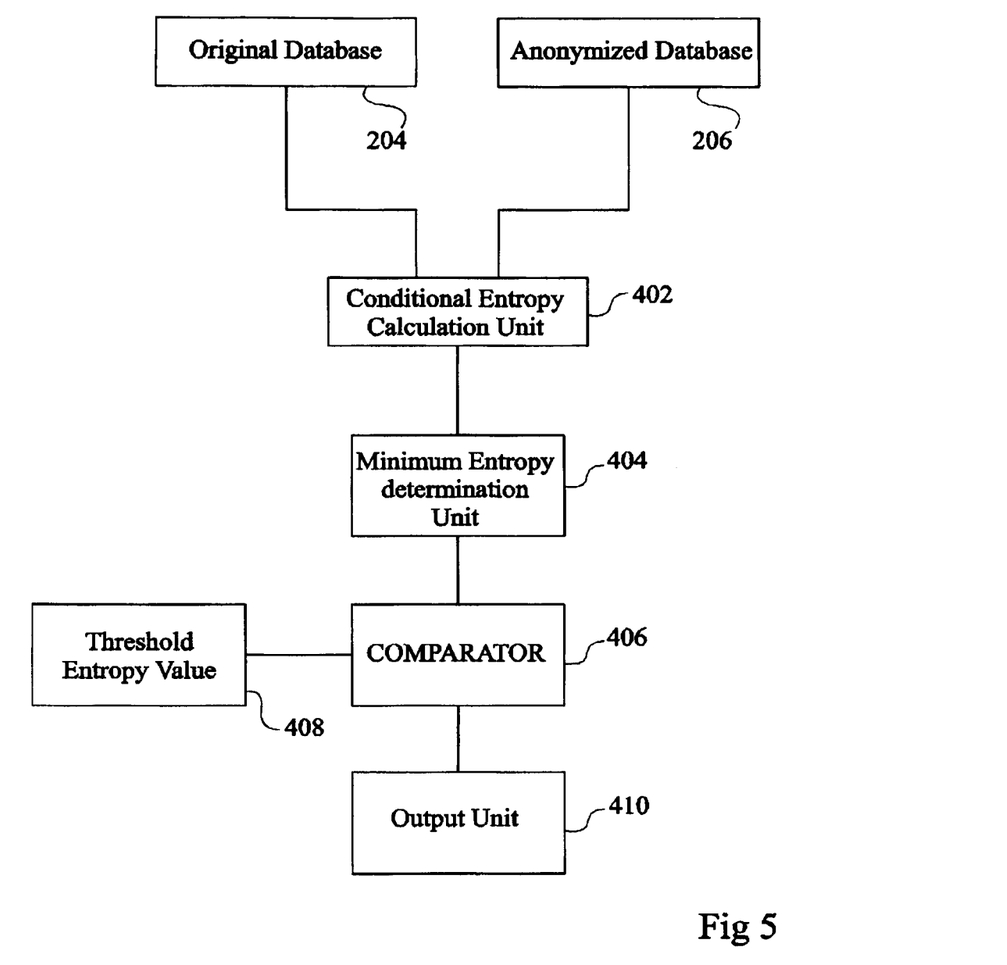
FIG. 5 illustrates a data anonymity measuring device in more detail according to an embodiment of the present invention.

FIG. 5 illustrates the system for measuring anonymity of the database, and implementing the method of FIG. 4, in more detail.

As shown, a conditional entropy calculation unit 402 is coupled to memory containing the original database 204 and the anonymized database 206, and thus has access to the entries in these databases. For example it may be connected directly, or via a network. Unit 402 calculates the conditional entropy for each entry in the anonymized database. The results are provided to a minimum entropy determination unit 404, which determines the minimum of the conditional entropies calculated. A comparator 406 is coupled to the minimum entropy determination block and compares the minimum conditional entropy with a threshold entropy value stored in a memory 408. The comparator 406 is coupled to an output unit 410 which provides an output based on the result of the comparison. The output unit 410 could be a display to display a message to a user indicating the result of the anonymity measurement, or alternatively it could be a communication interface such as a modem or network interface via which the system can immediately send the anonymized database. Alternatively the output unit 410 could comprise both display and communications interface.

The units 402 to 410 of FIG. 5 could be implemented in various arrangements, and for example could be implemented by a single personal computer, in the form of software having code for implementing the functions of each unit. Thus a program product could be provided, for example in the form of a compact disk or digital versatile disk containing a program for running on a computer that implements the functions of the individual units of FIG. 5 or the steps in the flow diagram of FIG. 4.

Thus a system has been described that provides a measure of anonymity of an anonymized database, that provides the technical result of transmission of the database to a third party, or alternatively an output on a display device indicating that the database is cleared for transmission.

Advantageously the measure of anonymization is based on the conditional entropy calculated for each entry in the anonymized database, and therefore this method takes a worst case value from the whole database, ensuring that each value in the anonymized database is sufficiently anonymized.

The method of determining a measure for anonymity described herein has the further advantage that it may be applied irrespective of the particular method used to anonymized the data, and without a detailed knowledge of the method used. In particular, a copy of the anonymized database and of the original database is sufficient to be able to determine the probability that an entry in the original database is the source of an entry in the anonymized database, and thus calculate the conditional entropy using a general assumption about the type of noise (e.g. Gaussian). On the other hand, algorithms for determining the probability P(r|s) may be customized based on additional background knowledge. For example, the specific structure of added noise, or correlations between different fields (such as weight and height in a medical database).

Advantageously, the system determines the anonymity based on the conditional entropy of each entry in the anonymized database, which provides a good indication of anonymity, and works with various forms of anonymized data, including generalization, suppression and randomization.

Given that the present method is an iterative process that may be repeated many times, it is also possible to anonymized the database in stages, and then test the anonymity of the database after each stage, until the database is sufficiently anonymized. This allows a relatively precise level of anonymity to be achieved before the database is sent to external third parties. In particular, a good balance can be achieved between maintaining a useful quantity of information in the database, while not disclosing sensitive information.

Whilst specific examples have been provided in the specification, it will be apparent that there are various alternatives or variations that may be applied. For example, the method described herein, along with the apparatus described, may be applied to any size of database, comprising any number of entries, and each entry may comprise any number of fields of data.

Furthermore, while one iterative process has been described for performing the entropy calculation, it will be apparent that there are alternative methods that could be used. For example, while in the described embodiments entropy values for each entry in the anonymized database are calculated, and then only the minimum of these values compared to a threshold, in alternative embodiments each value could be systematically compared to the threshold value, without a minimum value being taken. In this case, step S5 of FIG. 4 could be replaced by a comparison of h with $h_t$, and if h is less than ht the next step would be S10, whereas if not, the next step would be S7. Steps S5, S6 and S9 can be removed in this embodiment, and the step after S7 would be S11.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended to be limiting. The invention is limited only as defined in the following claims and the equivalent thereto.

The invention claimed is:

1. A device comprising:
a memory to store instructions; and
a processor to execute the instructions to:
calculate a conditional conditional entropy for each entry in an anonymized database,
each conditional entropy being based on a probability of each entry existing in an original database,
the probability of each entry being based on a respective entry existing in the anonymized database, and
the processor, when calculating the conditional entropy for each entry in the anonymized database, is to:
calculate the conditional entropy for each entry in the anonymized database using a formula that is based on:
a first value that represents each entry in the original database,
a second value that represents one of the entries in the original database,
a third value that represents one of the entries in the anonymized database, and
a fourth value that represents a probability of the second value based on the third value;
compare at least one calculated conditional entropy with a threshold value; and
transmit, based on comparing the at least one calculated entropy with the threshold value, information associated with the anonymized database,
the information including at least one of the entries in the anonymized database.

2. The device of claim 1, where the formula is:

$$h(s) = -\sum_{r \in R} P(r \mid s) \log_2 P(r \mid s)$$

where r is an entry in the original database and corresponds to the second value, R represents all of the entries in the original database and corresponds to the first value, s is an entry in the anonymized database and corresponds to the third value, and P(r|s) is the probability of r given s and corresponds to the fourth value.

3. The device of claim 1, where the processor is further to:
determine a minimum entropy of the calculated conditional entropy for each entry in the anonymized database;
compare the determined minimum conditional entropy with the threshold value; and
process, based on comparing the determined minimum conditional entropy with the threshold value, the information associated with the anonymized database.

4. The device of claim 1, where the processor, when transmitting the information associated with the anonymized database, is further to:
transmit the information associated with the anonymized database to another device, the other device being different than the device.

5. The device of claim 1, where the processor is further to:
erase, based on comparing the at least one calculated conditional entropy with the threshold value, the information associated with the anonymized database.

6. The device of claim 1, where
an identifier associated with an entry, of the entries in the original database, includes a particular first value, and
an identifier associated with a corresponding entry, of the entries in the anonymized database, includes a modified first value,
the modified first value including a subset of information included in the particular first value.

7. The device of claim 1, where
an identifier associated with an entry, of the entries in the original database, includes a particular first value, and
an identifier associated with a corresponding entry, of the entries in the anonymized database, includes a modified first value,
information included in the modified first value being different than information included in the particular first value.

8. A method comprising:
calculating, by a device, a conditional entropy for each entry in an anonymized database,
each conditional entropy being based on a probability of each entry existing in an original database,
the probability of each entry being based on a respective entry existing in the anonymized database, and
calculating the conditional entropy for each entry in the anonymized database including:
calculating the conditional entropy for each entry in the anonymized database using a formula that is based on:
a first value that represents each entry in the original database,
a second value that represents one of the entries in the original database,
a third value that represents one of the entries in the anonymized database, and
a fourth value that represents a probability of the second value based on the third value;
comparing, by the device, at least one calculated conditional entropy with a threshold value; and
selectively transmitting, by the device and based on comparing the at least one calculated entropy with the threshold value, information associated with the anonymized database,
the information including at least one of the entries in the anonymized database.

9. The method of claim 8, where, when calculating the conditional entropy for each entry in the anonymized database, the method includes:
calculating a cumulative entropy (h) using:

$$h = h - P(r_a \mid S_b) \log_2 P(r_a \mid S_b)$$

where $r_a$ is a currently processed entry in the original database and $s_b$ is a currently processed entry in the anonymized database.

10. The method of claim 8, further comprising:
anonymizing, when the at least one calculated entropy is less than the threshold value, the information associated with the anonymized database.

11. The method of claim 8, where
an identifier associated with an entry, of the entries in the original database, includes a particular first value, and
an identifier associated with a corresponding entry, of the entries in the anonymized database, includes a modified first value,
the modified first value including a subset of information included in the particular first value.

12. The method of claim 8, where
an identifier associated with an entry, of the entries in the original database, includes a particular first value, and
an identifier associated with a corresponding entry, of the entries in the anonymized database, includes a modified first value,
information included in the modified first value being different than information included in the particular first value.

13. The method of claim 8, further comprising:
erasing, based on comparing the at least one calculated conditional entropy with the threshold value, the anonymized database.

14. The method of claim 8, further comprising:
determining a minimum entropy of the calculated conditional entropy for each entry in the anonymized database;
comparing the determined minimum conditional entropy with the threshold value; and
processing, based on comparing the determined minimum conditional entropy with the threshold value, the information associated with the anonymized database.

15. A non-transitory computer-readable storing instructions, the instructions comprising:
one or more instructions, which, when executed by a processor, cause the processor to:
calculate a conditional entropy for each entry in an anonymized database,
each conditional entropy being based on a probability of each entry existing in an original database,
the probability of each entry being based on a respective entry existing in the anonymized database, and
the one or more instructions to calculate the conditional entropy for each entry in the anonymized database include:

one or more instructions to calculate the conditional entropy for each entry in the anonymized database using a formula that is based on:
a first value that represents each entry in the original database,
a second value that represents one of the entries in the original database,
a third value that represents one of the entries in the anonymized database, and
a fourth value that represents a probability of the second value based on the third value;
compare at least one calculated conditional entropy with a threshold value; and
selectively transmit, based on comparing the at least one calculated entropy with the threshold value, information associated with the anonymized database,
the information including at least one of the entries in the anonymized database.

16. The medium of claim 15, where
an identifier associated with an entry, of the entries in the original database, includes a particular first value, and
an identifier associated with a corresponding entry, of the entries in the anonymized database, includes a modified first value,
the modified first value including a subset of information included in the particular first value.

17. The medium of claim 15, where
an identifier associated with an entry, of the entries in the original database, includes a particular first value, and
an identifier associated with a corresponding entry, of the entries in the anonymized database, includes a modified first value,
information included in the modified first value being different than information included in the particular first value.

18. The medium of claim 15, where the instructions further include:
one or more instructions to determine a minimum entropy of the calculated conditional entropy for each entry in the anonymized database;
one or more instructions to compare the determined minimum conditional entropy with the threshold value; and
one or more instructions to process, based on comparing the determined minimum conditional entropy with the threshold value, the information associated with the anonymized database.

19. The medium of claim 15, where the instructions further include:
one or more instructions to erase, based on comparing the at least one calculated conditional entropy with the threshold value, the anonymized database.

20. The medium of claim 15, where the instructions further include:
one or more instructions to anonymize, when the at least one calculated entropy is less than the threshold value, the information associated with the anonymized database.

* * * * *

UNITED STATES PATENT AND TRADEMARK OFFICE
CERTIFICATE OF CORRECTION

| | |
|---|---|
| PATENT NO. | : 8,990,252 B2 |
| APPLICATION NO. | : 13/735727 |
| DATED | : March 24, 2015 |
| INVENTOR(S) | : Michele Bezzi |

Page 1 of 1

It is certified that error appears in the above-identified patent and that said Letters Patent is hereby corrected as shown below:

Claims

Column 10, line 40, claim 1, "calculate a conditional conditional" should read --calculate a conditional--.

Signed and Sealed this
Twenty-eighth Day of July, 2015

Michelle K. Lee
*Director of the United States Patent and Trademark Office*